United States Patent
Taniguchi et al.

(10) Patent No.: US 10,926,693 B2
(45) Date of Patent: Feb. 23, 2021

(54) METHOD FOR CONTROLLING DIRECTION INDICATOR AND DEVICE FOR CONTROLLING DIRECTION INDICATOR

(71) Applicants: Nissan Motor Co., Ltd., Yokohama (JP); Renault S.A.S., Boulogne-Billancourt (FR)

(72) Inventors: Yohei Taniguchi, Kanagawa (JP); Tatsuya Shino, Kanagawa (JP); Shuko Ishimaru, Kanagawa (JP); Atsushi Ito, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 16/606,865

(22) PCT Filed: Apr. 27, 2017

(86) PCT No.: PCT/JP2017/016706
§ 371 (c)(1),
(2) Date: Oct. 21, 2019

(87) PCT Pub. No.: WO2018/198264
PCT Pub. Date: Nov. 1, 2018

(65) Prior Publication Data
US 2020/0130567 A1     Apr. 30, 2020

(51) Int. Cl.
*B60Q 1/40*     (2006.01)
*B60Q 1/38*     (2006.01)
*B60W 30/12*     (2020.01)

(52) U.S. Cl.
CPC .............. *B60Q 1/40* (2013.01); *B60Q 1/38* (2013.01); *B60W 30/12* (2013.01)

(58) Field of Classification Search
CPC ... B60Q 1/38; B60Q 1/40; B60Q 1/42; B60Q 1/346; B60W 30/12
See application file for complete search history.

(56) References Cited

U.S. PATENT DOCUMENTS

| | | | | |
|---|---|---|---|---|
| 5,438,314 A | * | 8/1995 | Evans | B60Q 1/343 |
| | | | | 200/61.27 |
| 6,975,218 B2 | * | 12/2005 | Madau | B60Q 1/40 |
| | | | | 180/167 |
| 7,236,884 B2 | * | 6/2007 | Matsumoto | B60T 8/17557 |
| | | | | 340/435 |

(Continued)

FOREIGN PATENT DOCUMENTS

| | | |
|---|---|---|
| JP | H08132957 A | 5/1996 |
| JP | 2006117047 A | 5/2006 |

(Continued)

*Primary Examiner* — Adnan Aziz
(74) *Attorney, Agent, or Firm* — Young Basile Hanlon & MacFarlane, P.C.

(57) ABSTRACT

A direction indicator is configured to start blinking in response to an operation of a driver of a subject vehicle and automatically turn off after a first blinking time elapses. When the subject vehicle changes lanes in an automated or autonomous manner due to the operation of the driver, a control apparatus is used to extend the first blinking time to a second blinking time longer than the first blinking time and control the direction indicator to automatically turn off.

5 Claims, 2 Drawing Sheets

(56) References Cited

U.S. PATENT DOCUMENTS

| | | | | |
|---|---|---|---|---|
| 7,559,678 B2* | 7/2009 | Tsai | ............ | B60Q 1/38 307/116 |
| 8,242,898 B2* | 8/2012 | Ieda | ............ | B60Q 1/40 340/438 |
| 8,577,554 B2* | 11/2013 | Wolterman | ............ | B60Q 1/34 701/36 |
| 8,666,599 B2* | 3/2014 | Otuka | ............ | B60W 30/12 701/41 |
| 10,239,524 B2* | 3/2019 | Christensen | ............ | B60W 50/10 |
| 2010/0308988 A1 | 12/2010 | Ieda et al. | | |
| 2011/0199200 A1* | 8/2011 | Lueke | ............ | B60Q 1/38 340/435 |
| 2012/0271500 A1* | 10/2012 | Tsimhoni | ............ | B62D 1/046 701/23 |
| 2013/0184926 A1* | 7/2013 | Spero | ............ | B60W 10/20 701/26 |
| 2015/0022336 A1* | 1/2015 | Mueller | ............ | B60Q 1/40 340/477 |
| 2015/0161894 A1* | 6/2015 | Duncan | ............ | G08G 1/163 701/1 |
| 2016/0185279 A1* | 6/2016 | Zagorski | ............ | B60Q 1/346 701/36 |
| 2017/0057404 A1 | 3/2017 | Park | | |
| 2017/0225685 A1* | 8/2017 | Aoki | ............ | B60Q 1/40 |

FOREIGN PATENT DOCUMENTS

| | | | |
|---|---|---|---|
| JP | 2007-223382 A | | 9/2007 |
| JP | 2008-189216 A | | 8/2008 |
| JP | 2009-274594 A | | 11/2009 |
| JP | 2010018184 A | * | 1/2010 |
| JP | 2010280272 A | | 12/2010 |
| JP | 2016071514 A | | 5/2016 |
| JP | 2017-030436 A | | 2/2017 |
| KR | 20080000729 A | | 1/2008 |

* cited by examiner

METHOD FOR CONTROLLING DIRECTION INDICATOR AND DEVICE FOR CONTROLLING DIRECTION INDICATOR

TECHNICAL FIELD

The present invention relates to a method of controlling a direction indicator and an apparatus for controlling a direction indicator.

BACKGROUND

A turn signal lighting control device is known which operates to: calculate a movement distance of a vehicle in the lateral direction from a time point when a turn signal provided in the vehicle is lighted by the operation of an operating means for the turn signal; and turn off the turn signal when the movement distance in the lateral direction is a threshold or more, and the turn signal is thus automatically turned off (JP2010-280272A).

In the prior art, even when changing lanes by the automated or autonomous drive control for performing travel control of the vehicle in an automated or autonomous manner, control of the turn signal is the same as that in the case of changing lanes by the driver's steering control. In the lane change by the automated or autonomous drive control, therefore, the turn signal may keep blinking because a determination is made that the lane change cannot be performed after the turn signal is lighted. This causes a problem in that the driver is forced to turn off the turn signal and the burden on the driver increases.

SUMMARY

A problem to be solved by the present invention is to mitigate the burden on the driver of a vehicle that can change lanes in an automated or autonomous manner.

The present invention solves the above problem through: for a direction indicator configured to start blinking in response to an operation of a driver of a subject vehicle and automatically turn off after a first blinking time elapses, when the subject vehicle changes lanes in an automated or autonomous manner due to the operation of the driver, extending the first blinking time to a second blinking time longer than the first blinking time; and controlling the direction indicator to automatically turn off.

According to the present invention, it is possible to mitigate the burden on the driver of a vehicle that can change lanes in an automated or autonomous manner.

DETAILED DESCRIPTION

Hereinafter, one or more embodiments of the present invention will be described with reference to the drawings. In one or more embodiments of the present invention, an exemplary case will be described in which a control apparatus 100 according to the present invention is applied to a control system 1 equipped in a vehicle. The control system 1 according to one or more embodiments of the present invention is a system that controls the blinking time of a direction indicator, and operates to appropriately vary the blinking time on the basis of the traveling state of a subject vehicle and the traffic information around the subject vehicle.

Figure 1:
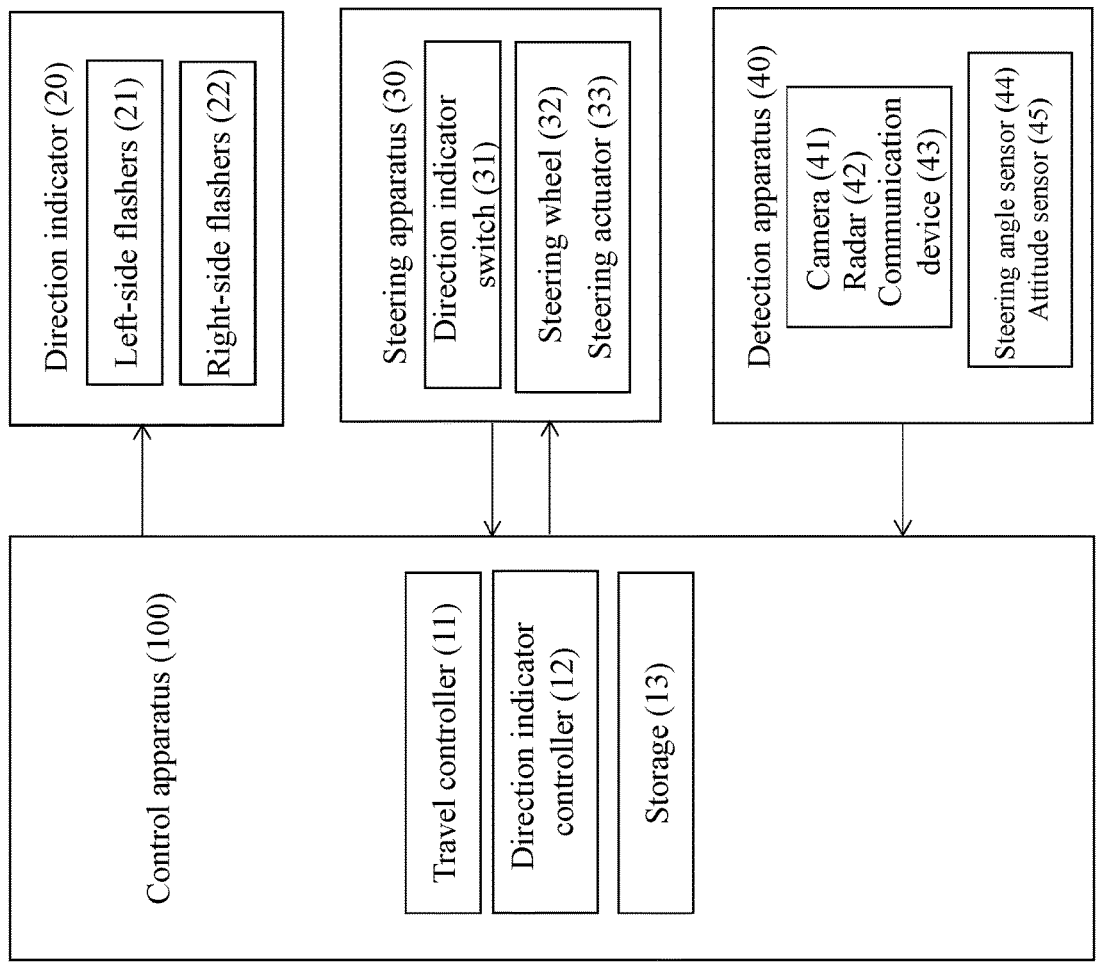
FIG. 1 is a configuration diagram of a control system including a control apparatus for a direction indicator according to one or more embodiments of the present invention.

FIG. 1 is a block configuration diagram of the control system 1 including the control apparatus 100 for a direction indicator according to one or more embodiments of the present invention. As illustrated in FIG. 1, the control system 1 according to one or more embodiments of the present invention includes a direction indicator 20, a steering apparatus 30, a detection apparatus 40, and the control apparatus 100. These components are connected to one another via a controller area network (CAN) or other onboard LAN and can mutually exchange information.

In one or more embodiments of the present invention, an exemplary case will be described in which the control system 1 is applied to a vehicle. The vehicle according to one or more embodiments of the present invention may be a manned vehicle that can carry one or more human occupants. It is assumed that the driver's seat of the vehicle and a steering wheel 32 described later are provided on the right side of the center of the vehicle. It is also assumed that the vehicle according to one or more embodiments of the present invention travels through a portion on the left side of the center of the road (keep-left traffic).

The direction indicator 20 according to one or more embodiments of the present invention is provided at a predetermined position of the vehicle. The direction indicator 20 is composed of one or more left-side flashers 21 and one or more right-side flashers 22. The left-side flashers 21 may be mounted near the left front and rear corners of the subject vehicle and on the left side of the subject vehicle. The right-side flashers 22 may be mounted near the right front and rear corners of the subject vehicle and on the right side of the subject vehicle.

These flashers of the direction indicator 20 have lamps inside for blinking. When the driver of the subject vehicle operates a direction indicator switch 31 which will be described later, the flashers of the direction indicator 20 blink in amber color. Thus, the direction indicator 20 is an apparatus for indicating to the surroundings the direction when the subject vehicle turns right or left or changes lanes. It is preferred to install the flashers of the direction indicator 20 at positions that allow third persons existing around the subject vehicle to visually confirm the flashers blinking. For example, with regard to the sides of the subject vehicle, one of the left-side flashers 21 is provided at the position of the left-side mirror of the subject vehicle while one of the right-side flashers 22 is provided at the position of the right-side mirror of the subject vehicle.

The direction indicator 20 receives a blinking start signal and a blinking time signal from the control apparatus 100 which will be described later. The blinking start signal is a signal that allows the direction indicator 20 to start blinking, and is generated when the driver operates the direction indicator switch 31 which will be described later. The blinking time signal includes information on the blinking time of the direction indicator 20. The blinking time of the direction indicator 20 is set by the control apparatus 100 in accordance with the travel control of the subject vehicle and/or the traffic situation around the subject vehicle. The operation of the direction indicator 20 will be described later.

The direction indicator 20 according to one or more embodiments of the present invention has a one-touch function. The direction indicator 20 performs different blinking in accordance with ON or OFF of the one-touch function. The one-touch function is provided to reduce the burden on the driver who operates the direction indicator 20. The driver turns on or off the one-touch function of the direction indicator 20 by performing different operations on the direction indicator switch 31 which will be described later. The operation of the direction indicator switch 31 by the driver is output as an operation signal to the control apparatus 100, which sets the one-touch function of the direction indicator 20 to ON or OFF. The one-touch function will be described later.

The steering apparatus 30 includes the direction indicator switch 31, a steering wheel 32, and a steering actuator 33. The steering apparatus 30 executes turning control of the subject vehicle on the basis of an input signal generated by the operation of the steering wheel 32. A control signal is input to the steering apparatus 30 as will be described later.

The direction indicator switch 31 is a switch that is operated by the driver to blink or turn off the direction indicator 20, and is installed on the right side of the steering column as viewed from the driver. Examples of the shape of the direction indicator switch 31 include a lever shape. In one or more embodiments of the present invention, the direction indicator switch will be described as being in a laver shape. The direction indicator switch 31 is a switch that is movable among a central position, an upper position located above the central position as viewed from the driver, and a lower position located below the central position as viewed from the driver. The driver can tilt the direction indicator switch 31 from the central position to the upper position or to the lower position. The tilted direction indicator switch 31 holds its position at the upper position or the lower position. This operation by the driver will be referred to as a "holding operation" of the direction indicator switch 31, hereinafter. The driver can also return the direction indicator switch 31, which has been tilted to the upper position or the lower position, to the central position. The shape of the direction indicator switch 31 is not particularly limited and may also be a button shape or a switch shape.

The direction indicator switch 31 includes an elastic material such as a spring. When the driver moves the direction indicator switch 31 upward or downward within a predetermined range without tilting the direction indicator switch 31 from the central position to the upper position or the lower position, the direction indicator switch 31 automatically returns to the central position by means of the elastic material. This operation by the driver will be referred to as a "one-touch operation" of the direction indicator switch 31, hereinafter.

When the driver performs the holding operation or the one-touch operation for the direction indicator switch 31, the direction indicator switch 31 outputs the operation of the driver as an operation signal to the control apparatus 100. The operation signal includes information on the "holding operation" for the direction indicator switch 31 by the driver and information on the "one-touch operation" for the direction indicator switch 31 by the driver. The driver can operate the direction indicator switch 31 upward from the central position thereby to control the blinking and turning off of the left-side flashers 21. On the other hand, the driver can operate the direction indicator switch 31 downward from the central position thereby to control the blinking and turning off of the right-side flashers 22.

The steering wheel 32 is an annular component for operating the steering mechanism to adjust the traveling direction of the subject vehicle by being rotated. The driver grasps the steering wheel 32 with both hands and rotates it to adjust the traveling direction.

The steering actuator 33 includes a motor and other necessary components attached to the column shaft of the steering wheel 32. The steering actuator 33 actuates the vehicle on the basis of an input signal generated by the driver operating the steering wheel 32 or a control signal input from the control apparatus 100 which will be described later.

The detection apparatus 40 includes a device for detecting other vehicles and a device for acquiring information on the subject vehicle. The former device is composed of a camera 41, radar 42, and a communication device 43. The latter device is composed of a steering angle sensor 44 and an attitude sensor 45. In one or more embodiments of the present invention, these components of the detection apparatus 40 are installed at respective predetermined positions of the subject vehicle, but the installation positions are not particularly limited, and they may be installed at freely selected positions.

The camera 41 is installed at a predetermined position of the subject vehicle to capture images around the subject vehicle. The camera 41 outputs the captured images around the subject vehicle to the control apparatus 100.

The radar 42 is installed at a predetermined position of the subject vehicle to detect other vehicles existing around the subject vehicle. The radar 42 outputs detection results of obstacles detected ahead of, behind, or laterally the subject vehicle to the control apparatus 100.

The communication device 43 is a device that allows for communication with other vehicles existing around the subject vehicle, that is, so-called inter-vehicle communication, and is installed at a predetermined position of the subject vehicle. The communication device 43 outputs the communication results with other vehicles to the control apparatus 100.

The steering angle sensor 44 detects a trigger with which movement control of the subject vehicle to the right or left is started. The steering angle sensor 44 can detect the trigger by detecting the movement timing of the steering wheel 32 of the steering apparatus 30. In addition, the steering angle sensor 44 can detect the rotation angle of the steering wheel 32 thereby to detect whether the rotation direction of the steering wheel 32 is clockwise or counterclockwise. The steering angle sensor 44 outputs the detection results to the control apparatus 100.

The attitude sensor 45 detects the attitude of the subject vehicle on the basis of the information regarding the vehicle body structure, such as the weight, center of gravity, and wheel base, of the subject vehicle and the information regarding the attitude of the vehicle, such as the pitching angle, yaw angle, and suspension stroke amount. The attitude sensor 45 outputs the detection results to the control apparatus 100.

The control apparatus 100 according to one or more embodiments of the present invention will then be described. The control apparatus 100 according to one or more embodiments of the present invention includes a travel controller 11, a direction indicator controller 12, and a storage 13. The travel controller 11 and the direction indicator controller 12 can mutually exchange information between the blocks. The direction indicator controller 12 can control the direction indicator 20 with reference to the results and the like executed by the travel controller 11 which will be described later.

The travel controller 11 includes an ECU that manages various information items of the vehicle and controls the operation of the vehicle. The travel controller 11 according to one or more embodiments of the present invention acquires the existence information of other vehicles and the subject vehicle information which are detected by the detection apparatus 40. The existence information of other vehicles includes the captured images around the subject vehicle from the camera 41, the obstacle information around the subject vehicle from the radar 42, and the communication results with other vehicles from the communication device 43. The subject vehicle information includes the steering angle from the steering angle sensor 44 and the detection result of the attitude of the subject vehicle from the attitude sensor 45.

The travel controller 11 controls the travel of the vehicle. The travel controller 11 can switch between the travel by the driver's steering control and the travel by the automated or autonomous drive control. The travel by the driver's steering control refers to a travel which the driver conducts while controlling the traveling direction, the traveling speed, etc. For example, the driver steps on the accelerator with a certain force and turns the steering wheel 32 clockwise, thereby controlling the subject vehicle to travel forward to the right.

On the other hand, the travel by the automated or autonomous drive control refers to a travel which the travel controller 11 conducts in an automated or autonomous manner while controlling the traveling direction, the traveling speed, etc. even without the driver's control of the accelerator and the steering wheel 32. The travel controller 11 according to one or more embodiments of the present invention has an automated or autonomous lane change function as one of the functions responsible for the travel by the automated or autonomous drive control.

The automated or autonomous lane change function refers to a function of changing lanes in an automated or autonomous manner to another lane from the lane in which the subject vehicle is traveling. The travel controller 11 can output a control signal to the steering apparatus 30 thereby to operate the steering wheel 32 in place of the driver's steering control. The lane change control performed by the travel controller 11 is not limited to the rotation control of the steering wheel 32. For example, the travel controller 11 may simply control the tire angle to execute the lane change. In addition or alternatively, the travel controller 11 may execute the lane change control using the difference between the right and left braking forces.

The automated or autonomous lane change function can be switched between valid and invalid by the travel controller 11 or the driver. For example, the driver may set the automated or autonomous lane change function from the setting screen displayed on the interior display. In addition or alternatively, the travel controller 11 may set the automated or autonomous lane change function on the basis of the detection results of the detection apparatus 40. Methods of setting the automated or autonomous lane change function are not particularly limited.

When the automated or autonomous lane change function is valid, the travel controller 11 starts the process of changing lanes by the automated or autonomous drive control in response to the driver operating the direction indicator switch 31. Specifically, the travel controller 11 detects information on the driver's "one-touch operation" of the direction indicator switch 31 from the operation signal which is output from the direction indicator switch 31. Then, due to this "one-touch operation," the travel controller 11 starts the process of changing lanes by the automated or autonomous drive control. In one or more embodiments of the present invention, the driver performs the "one-touch operation" of the direction indicator switch 31 thereby to start blinking of the direction indicator 20 and start the process of changing lanes by the automated or autonomous drive control.

First, the travel controller 11 determines whether or not the lane change is possible by the automated or autonomous drive control, on the basis of the detection result of each component which is input from the detection apparatus 40. In one or more embodiments of the present invention, the travel controller 11 determines whether or not an obstacle is present in an adjacent lane to the lane in which the subject vehicle travels. Adjacent lanes include the right-side lane and the left-side lane with reference to the lane in which the subject vehicle travels. Obstacles include other vehicles, two-wheel vehicles (such as motorcycles and bicycles), road structures, parking lots, traffic signs, facilities, and other objects.

For example, the travel controller 11 executes image processing on the image captured by the camera 41 and determines whether or not another vehicle is present in an adjacent lane and whether or not to execute the lane change. In addition or alternatively, the travel controller 11 determines whether or not another vehicle is present, for example, from the detection result of the radar 42 and determines whether or not to execute the lane change. In addition or alternatively, the travel controller 11 may determine the existence of another vehicle with reference to the record or the like, which is made when communicating with other vehicles, from the communication results of the communication device 43. In an embodiment, the travel controller 11 may detect the existence of respective other vehicles from the image captured by the camera 41, from the detection result of the radar 42, and from the communication results of the communication device 43.

When determining that execution of the lane change is possible, the travel controller 11 controls the subject vehicle to change lanes in an automated or autonomous manner. For example, the travel controller 11 executes a program for lane change that is preliminarily stored in the storage 13 for changing lanes from the currently traveling lane to the right-side lane or to the left-side lane. An automated or autonomous drive control device known at the time of filing of this application can be appropriately used for the travel controller 11.

The travel controller 11 also detects the direction of the driver's steering control on the basis of the detection result of each component which is input from the detection apparatus 40.

For example, the travel controller 11 detects a trigger with which the movement control of the subject vehicle is started from the detection result of the steering angle sensor 44 and detects the direction of the driver's steering control from the steering angle. When the steering angle is an angle that indicates the clockwise rotation of the steering wheel 32, the travel controller 11 detects that the direction of the driver's steering control is the right direction. On the other hand, when the steering angle is an angle that indicates the counterclockwise rotation of the steering wheel 32, the travel controller 11 detects that the direction of the driver's steering control is the left direction.

Methods of detecting the direction of the driver's steering control are not limited to the above method. For example, the direction of the driver's steering control may be detected from the detection result of the attitude sensor 45. In an embodiment, the travel controller 11 may detect respective directions of the driver's steering control from the detection result of the steering angle sensor 44 and from the detection result of the attitude sensor 45.

When the subject vehicle changes lanes by the automated or autonomous drive control, the travel controller 11 determines whether or not the direction of the driver's steering control coincides with the direction of the lane change by the automated or autonomous drive control. The travel controller 11 compares the detected direction of the driver's steering control with the direction of the lane change which is preliminarily planned using the automated or autonomous lane change function. This allows the travel controller 11 to determine whether or not the direction of the driver's steering control coincides with the direction of the lane change by the automated or autonomous drive control.

The direction indicator controller 12 and storage 13 according to one or more embodiments of the present invention will then be described. The direction indicator controller 12 includes a central processing unit (CPU) as an operation circuit that executes programs stored in the storage 13 thereby to realize the functions of the control apparatus 100. The programs stored in the storage 13 serve to control the direction indicator 20. A micro processing unit (MPU), an application specific integrated circuit (ASIC), a field programmable gate array (FPGA), or the like may also be used as the operation circuit. The storage 13 includes a ROM and a random access memory (RAM) that serves as an accessible storage.

The direction indicator controller 12 of the control apparatus 100 realizes a state detection function, a travel control determination function, and a blinking time control function. The control apparatus 100 executes the above functions by cooperation of software for realizing the functions and the above-described hardware.

The state detection function of the direction indicator controller 12 will first be described. The control apparatus 100 detects the state of the direction indicator 20.

The control apparatus 100 according to one or more embodiments of the present invention outputs the operation signal, which is input from the direction indicator switch 31, as a blinking start signal to the direction indicator 20 and controls the direction indicator 20 to start blinking. When the blinking start signal is input, the control apparatus 100 detects the timing at which the signal is input as a timing to start blinking of the direction indicator 20.

In addition, the control apparatus 100 turns on the one-touch function of the direction indicator 20 on the basis of the operation signal which is input from the direction indicator switch 31. When the operation signal includes the information on the "one-touch operation" of the direction indicator switch 31, the control apparatus 100 turns on the one-touch function of the direction indicator 20. On the other hand, when the operation signal includes the information on the "holding operation" of the direction indicator switch 31, the control apparatus 100 turns off the one-touch function of the direction indicator 20. As described above, when the automated or autonomous lane change function is valid and the operation signal includes the information on the "one-touch operation" of the direction indicator switch 31, the travel controller 11 of the control apparatus 100 starts the process of changing lanes by the automated or autonomous drive control.

Here, the one-touch function of the direction indicator 20 will be described.

When the driver turns on the one-touch function, the direction indicator 20 starts blinking in response to the blinking start signal which is input from the control apparatus 100. Then, the direction indicator 20 blinks for a blinking time included in the blinking time signal which is input from the control apparatus 100, and thereafter turns off automatically. For example, when the driver moves the direction indicator switch 31 upward within a predetermined range without tilting the direction indicator switch 31 from the central position to the upper position, the left-side flashers 21 receive a signal for turning on the one-touch function as well as the blinking start signal. The left-side flashers 21 start to blink, continue blinking for the blinking time which is set by the control apparatus 100, and then automatically turn off.

On the other hand, when the driver turns off the one-touch function, the direction indicator 20 blinks or turns off in accordance with the position (central position, upper position, lower position) of the direction indicator switch 31. For example, when the driver tilts the direction indicator switch 31 from the central position to the upper position, the left-side flashers 21 receive a signal for turning off the one-touch function as well as the blinking start signal. The left-side flashers 21 start to blink and then continue blinking until the driver returns the direction indicator switch 31 from the upper position to the central position. The left-side flashers 21 turn off when the driver returns the direction indicator switch 31 to the central position.

Thus, when the driver performs the "one-touch operation" of the direction indicator switch 31, the direction indicator 20 automatically executes the operation from the blinking to the turning off. It is therefore unnecessary to construct a complicated system and/or provide a complicated control apparatus in order to turn off the direction indicator 20. The scene in which the one-touch function is used varies depending on the length of the blinking time, but in general, the one-touch function is less likely to be used in a scene in which the vehicle turns right or left because such a scene requires a relatively long blinking time. The one-touch function may often be used in a scene of lane change in which a relatively short blinking time is sufficient. The driver may use the one-touch function to indicate the intention of lane change to the surroundings of the subject vehicle. In addition or alternatively, when the automated or autonomous lane change function is valid, the driver may use the one-touch function to start the lane change by the automated or autonomous drive control.

The detection function of the direction indicator controller 12 will be described again.

The control apparatus 100 determines whether the left-side flashers 21 or the right-side flashers 22 start blinking, on the basis of the operation signal which is input from the direction indicator switch 31. For example, in the case of a right-hand drive vehicle, when the driver tilts the direction indicator switch 31 from the central position to the upper position, the control apparatus 100 determines that the left-side flashers 21 are blinking.

The travel control determination function of the direction indicator controller 12 will then be described. The control apparatus 100 determines whether the travel control of the subject vehicle is based on the driver's steering control or the automated or autonomous drive control. In addition, when determining that the automated or autonomous drive control is performed, the control apparatus 100 detects whether the automated or autonomous lane change function is set valid or invalid.

The blinking time control function of the direction indicator controller 12 will then be described. The control apparatus 100 according to one or more embodiments of the present invention controls the blinking time of the direction indicator 20 when the one-touch function is turned on. In other words, the control apparatus 100 controls the blinking time from when the direction indicator 20 starts blinking to when it is automatically turned off. Examples of specific scenes include a scene in which the driver operates the direction indicator switch 31 to blink the direction indicator 20 when the subject vehicle changes lanes. In this operation, the control apparatus 100 controls the blinking time of the direction indicator 20 in accordance with the travel control of the subject vehicle or the situation around the subject vehicle. The control apparatus 100 according to one or more embodiments of the present invention does not control the blinking time of the direction indicator 20 when the one-touch function is turned off. The blinking time control function when the one-touch function is turned on will be described below with reference to a specific scene of lane change as an example.

The description will be directed first to a scene in which the subject vehicle changes lanes by the driver's steering control. When the travel control of the subject vehicle is based on the driver's steering control, the control apparatus 100 sets a predetermined blinking time (first blinking time) as the blinking time of the direction indicator 20. The first blinking time refers to the time from when the direction indicator 20 starts to blink to when it is automatically turned off, and is the time obtained by multiplying a one-time blinking time (e.g. several seconds) by the number of times of blinking. The interval of blinking may be a fixed time. The first blinking time according to one or more embodiments of the present invention is a time determined on the assumption of the lane change by driver's steering control. Specifically, the first blinking time is a time during which the intention to change lanes is indicated to other vehicles traveling around the subject vehicle. One or more embodiments of the present invention will be described on the assumption that the first blinking time is a time required for blinking three times (the one-time blinking time is one second).

The method of setting the first blinking time may include, for example, preliminarily storing the first blinking time in the storage 13. The control apparatus 100 reads out the first blinking time from the storage 13 and sets the first blinking time. The control apparatus 100 outputs the information on the blinking time as a blinking time signal to the direction indicator 20. The method of setting the first blinking time is not particularly limited. For example, the driver or an occupant of the subject vehicle may set the first blinking time via a specific device while the vehicle makes a stop.

The description will then be directed to a scene in which the subject vehicle changes lanes by the automated or autonomous lane change function of the automated or autonomous drive control. In this scene, the control apparatus 100 detects whether or not the driver's steering control occurs within a predetermined time included in a time period from when the direction indicator 20 starts to blink to when a determination is made as to whether or not the lane change by the automated or autonomous drive control is possible. This predetermined time may be, but is not limited to being, the same time as the first blinking time or a time shorter than the first blinking time.

When detecting the driver's steering control while the direction indicator 20 is blinking, and determining that the direction of the driver's steering control coincides with the direction of the lane change by the automated or autonomous drive control, the control apparatus 100 controls the direction indicator 20 to blink for the first blinking time from the timing at which the driver has steered. This will be specifically described. The control apparatus 100 determines whether the direction indicator 20 is blinking the left-side flashers 21 or the right-side flashers 22. For example, in the case in which the left-side flashers 21 are blinking, when the driver turns the steering wheel 32 to the left, the control apparatus 100 controls the left-side flashers 21 to blink for the first blinking time from the timing at which the driver has turned the steering wheel 32. In the case in which the first number of times of blinking is three, when detecting the driver's steering control to the left at the time point at which the direction indicator 20 has blinked three times, the control apparatus 100 controls the left-side flashers 21 to blink further three times from the timing of that detection.

Examples of the scene in which the driver steers in the direction of lane change while the direction indicator 20 is blinking include a scene in which it is necessary to suddenly change the destination and the driver determines that the driver should drive even after the lane change. As described above, the first blinking time is a time determined on the assumption that the lane change is carried out by the driver's steering control. It is therefore possible to prevent the situation in which the direction indicator 20 turns off immediately after the subject vehicle starts to change lanes, and the driver can change lanes without an uncomfortable feeling.

On the other hand, when the driver does not perform the steering control while the direction indicator 20 is blinking, the control apparatus 100 determines whether or not the lane change is possible by the automated or autonomous drive control. When determining that the lane change cannot be performed, the control apparatus 100 does not extend the first blinking time. In this scene, the control apparatus 100 outputs the blinking signal indicating the first blinking time to the direction indicator 20. The subject vehicle travels in the same lane without changing lanes, and the direction indicator 20 automatically turns off after the first blinking time elapses.

In contrast, when determining that the lane change can be performed by the automated or autonomous drive control, the control apparatus 100 extends the blinking time of the direction indicator 20. Specifically, the control apparatus 100 extends the blinking time from the first blinking time to the second blinking time. The second blinking time is a time longer than the first blinking time and refers to a time from when the direction indicator 20 starts to blink to when it is automatically turned off.

The method of setting the second blinking time is not particularly limited. The control apparatus 100 may increase the number of times of blinking to obtain the second blinking time without changing the one-time blinking time (e.g. one second) from that of the first blinking time. When the first number of times of blinking is three, for example, the control apparatus 100 sets a time required for blinking ten times as the second blinking time. In an alternative embodiment, the control apparatus 100 may increase the one-time blinking time to obtain the second blinking time without increasing the number of times of blinking from that of the first blinking time. When the first number of times of blinking is three (the one-time blinking time is one second), for example, the control apparatus 100 sets three as the number of times of blinking for the second blinking time (the one-time blinking time is three seconds).

The method of setting the second blinking time is exemplified as employing a configuration for changing the one-time blinking time or the number of times of blinking, but it is not limited to this. For example, the control apparatus 100 may change both the one-time blinking time and the number of times of blinking to set the second blinking time to a time longer than the first blinking time. In this case, the control apparatus 100 multiplies the one-time blinking time by the number of times of blinking to set the second blinking time to a time longer than the first blinking time.

The operation of the control apparatus 100 according to one or more embodiments of the present invention will then be described with reference to the flowchart of FIG. 2. It is assumed that the storage 13 preliminarily stores the first blinking time which is represented by N1 times (three times) as the number of times of blinking.

Figure 2:
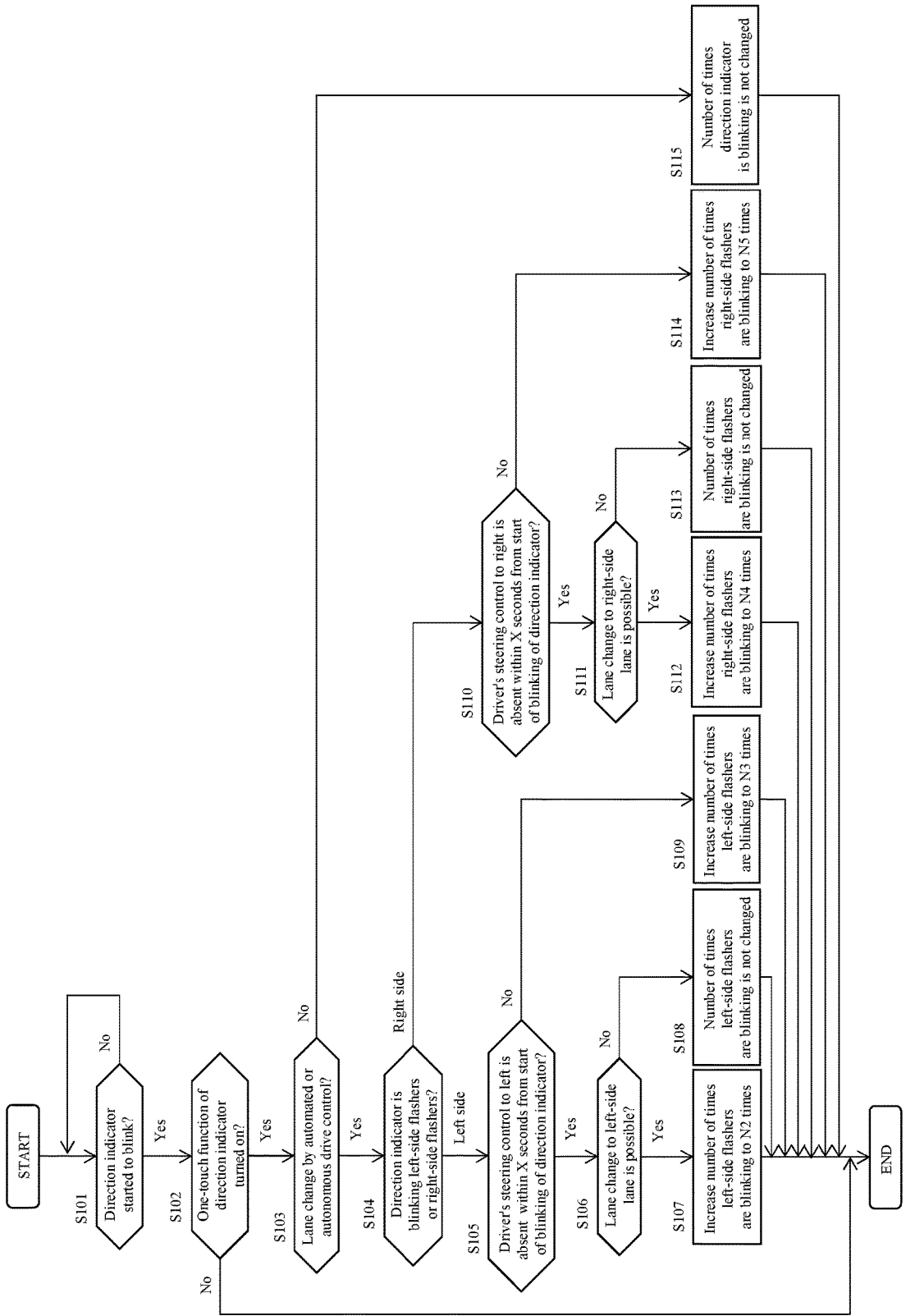
FIG. 2 is a flowchart illustrating a control procedure performed by the control apparatus for a direction indicator according to one or more embodiments of the present invention.

In FIG. 2, the blinking time (second blinking time) of the direction indicator 20 extended by the control apparatus 100 is represented by N2 to N5 times. For descriptive purposes, the description is made on the assumption of N2 times=ten times, N3 times=six times, N4 times=ten times, and N5 times=six times, but these numbers of times can be set to optimum values through experiments.

In step S101, the control apparatus 100 determines whether or not the direction indicator 20 has started to blink. For example, when the driver operates the direction indication switch 31, an operation signal is input to the control apparatus 100, so the control apparatus 100 determines whether or not the direction indicator 20 has started to blink, in accordance with the operation signal. When the start of blinking is detected, the process proceeds to step S102, while when the start of blinking is not detected, the process waits in step S101.

In step S102, the control apparatus 100 turns on or off the one-touch function of the direction indicator 20. The control apparatus 100 turns on or off the one-touch function of direction indicator 20 on the basis of the operation signal which is input from the direction indicator switch 31 in step S101. For example, when the driver moves the direction indicator switch 31 upward or downward within a predetermined range without tilting the direction indicator switch 31 from the central position to the upper position or to the lower position, the control apparatus 100 turns on the one-touch function. When the one-touch function is turned on, the process proceeds to step S103. On the other hand, when the driver tilts the direction indicator switch 31 from the central position to the upper position or to the lower position, the control apparatus 100 turns off the one-touch function of the direction indicator 20. When the one-touch function is turned off, the operation of the control apparatus 100 is ended.

In step S103, the control apparatus 100 determines whether the travel control of the subject vehicle is based on the driver's steering control or the automated or autonomous drive control. Detection of the driver's steering control is followed by step S115. When detecting the automated or autonomous drive control, the control apparatus 100 detects whether the automated or autonomous lane change function is valid or invalid. When detecting that the automated or autonomous lane change function is valid, the process proceeds to step S104. When detecting that the automated or autonomous lane change function is invalid, the process proceeds to step S115.

In step S104, the control apparatus 100 determines whether the direction indicator 20 is blinking the left-side flashers 21 or the right-side flashers 22. At this moment, the left-side flashers 21 or the right-side flashers 22 are blinking while the subject vehicle traveling by the automated or autonomous drive control does not change lanes. In addition, the control apparatus 100 starts the process of changing lanes by the automated or autonomous drive control. When a determination is made that the direction indicator is blinking the left-side flashers 21, the process proceeds to step S105. When a determination is made that the direction indicator is blinking the right-side flashers 22, the process proceeds to step S110.

In step S105, the control apparatus 100 detects the driver's steering control to the left within a predetermined time from the start of blinking of the direction indicator 20. The predetermined time refers to the same time as the first blinking time or a time shorter than the first blinking time and is, for example, a time in a few seconds (X seconds). When the driver's steering control to the left is not detected, the process proceeds to step S106. When the driver's steering control to the left is detected, the process proceeds to step S109.

In step S106, the control apparatus 100 determines whether or not the lane change to the left-side lane is possible. The left-side lane is a lane adjacent to the left side of the lane in which the subject vehicle is traveling. When a determination is made that the lane change to the left-side lane is possible, the process proceeds to step S107. When a determination is made that the lane change to the left-side lane is not possible, the process proceeds to step S108.

In step S107, the control apparatus 100 increases the number of times the left-side flashers 21 are blinking to N2 times (ten times) more than N1 times (three times). The control apparatus 100 outputs the blinking time signal, which indicates the blinking time corresponding to N2 times (ten times), to the direction indicator 20. When the blinking time of the left-side flashers 21 is extended, the operation of the control apparatus 100 is ended. At this moment, the subject vehicle is traveling by the automated or autonomous drive control while blinking the left-side flashers 21. In addition, the control apparatus 100 determines that the lane change to the left-side lane is possible by the automated or autonomous drive control. The control apparatus 100 controls the left-side flashers 21 to blink for the extended time corresponding to N2 times (ten times) rather than automatically turn off the left-side flashers 21 after blinking N1 times (three times).

In step S108, the control apparatus 100 does not change the number of times the left-side flashers 21 are blinking. The operation of the control apparatus 100 is ended without extending the blinking time of the left-side flashers 21. At this moment, the subject vehicle is traveling by the automated or autonomous drive control while blinking the left-side flashers 21. However, the control apparatus 100 determines that the lane change to the left-side lane is not possible. In a scene in which the lane change by the automated or autonomous drive control is difficult, the number of times of blinking is not unnecessarily extended. The direction indicator 20 is automatically turned off after blinking N1 times (three times), so that the driver can be prevented from being forced to turn off the direction indicator 20 which continues to blink.

When the driver's steering control to the left is detected in step S105, the process proceeds to step S109. In step S109, the control apparatus 100 increases the number of times the left-side flashers 21 are blinking to N3 times (six times) more than N1 times (three times). The control apparatus 100 outputs the blinking time signal, which indicates the blinking time corresponding to N3 times (six times), to the direction indicator 20. When the blinking time of the left-side flashers 21 is extended, the operation of the control apparatus 100 is ended. At this moment, the subject vehicle is traveling by the automated or autonomous drive control while blinking the left-side flashers 21. Then, the driver steers to the left and the subject vehicle is about to start lane change to the left side by the driver's steering control.

The number of times N3 (six times) is obtained by increasing the number of times of blinking by N1 times (three times) from the timing at which the driver has steered to the left. For example, when the driver steers to the left at the third blinking of the left-side flashers 21, the control apparatus 100 adds the number of times N1, that is, three, to the number of times the left-side flashers 21 have blinked until the driver steers, that is, also three. The control apparatus 100 sets the addition result of six times as N3 times. The number of times the direction indicator 20 blinks is increased by the number of times N1 (three times), which is set on the assumption that the lane change is carried out by the driver's steering control, at the timing when the driver starts the lane change. The direction indicator 20 is prevented from turning off in the middle of the lane change, and the driver can change lanes without an uncomfortable feeling.

When a determination is made in step S104 that the direction indicator 20 is blinking the right-side flashers 22, the process proceeds to step S110. Steps S110 to S114 represent operations of the control apparatus 100 when the right-side flashers 22 are controlled to blink. Steps S110 to S114 are the same as steps S105 to S109 described above, except that the blinking flashers are different.

In step S110, the control apparatus 100 detects the driver's steering control to the right within a predetermined time from the start of blinking of the direction indicator 20. The predetermined time in step S110 is set to the same time (X seconds) as the predetermined time in step S105. In an alternative embodiment, the predetermined time in step S110 may be a different time from the predetermined time in step S105. When the driver's steering control to the right is not detected, the process proceeds to step S111. When the driver's steering control to the right is detected, the process proceeds to step S114. At this moment, the right-side flashers 22 have started blinking.

In step S111, the control apparatus 100 determines whether or not the lane change to the right-side lane is possible. The right-side lane is a lane adjacent to the right side of the lane in which the subject vehicle is traveling. When a determination is made that the lane change to the right-side lane is possible, the process proceeds to step S112. When a determination is made that the lane change to the right-side lane is not possible, the process proceeds to step S113.

In step S112, the control apparatus 100 increases the number of times the right-side flashers 22 are blinking to N4 times (ten times) more than N1 times (three times). The control apparatus 100 outputs the blinking time signal, which indicates the blinking time corresponding to N4 times (ten times), to the direction indicator 20. When the blinking time of the right-side flashers 22 is extended, the operation of the control apparatus 100 is ended. At this moment, the subject vehicle is traveling by the automated or autonomous drive control while blinking the right-side flashers 22. In addition, the control apparatus 100 determines that the lane change to the right-side lane is possible by the automated or autonomous drive control. The control apparatus 100 controls the right-side flashers 22 to blink for the extended time corresponding to N4 times (ten times) rather than automatically turn off the right-side flashers 22 after blinking N1 times (three times).

In step S113, the control apparatus 100 does not change the number of times the right-side flashers 22 are blinking. The operation of the control apparatus 100 is ended without extending the blinking time of the right-side flashers 22. At this moment, the subject vehicle is traveling by the automated or autonomous drive control while blinking the right-side flashers 22. However, the control apparatus 100 determines that the lane change to the right-side lane is not possible.

When the driver's steering control to the right is detected in step S110, the process proceeds to step S114. In step S114, the control apparatus 100 increases the number of times the right-side flashers 22 are blinking to N5 times (six times) more than N1 times (three times). The control apparatus 100 outputs the blinking time signal, which indicates the blinking time corresponding to N5 times (six times), to the direction indicator 20. When the blinking time of the right-side flashers 22 is extended, the operation of the control apparatus 100 is ended. At this moment, the subject vehicle is traveling by the automated or autonomous drive control while blinking the right-side flashers 21. Then, the driver steers to the right and the subject vehicle is about to start lane change to the right side by the driver's steering control. For the number of times N5, the above description of the number of times N3 (six times) in step S105 is borrowed herein.

When the driver's steering control is detected in step S103, the process proceeds to step S115. In step S115, the control apparatus 100 does not change the number of times the left-side flashers 21 or the right-side flashers 22 are blinking. The operation of the control apparatus 100 is ended without extending the number of times the direction indicator 20 blinks. At this moment, the subject vehicle is traveling by the driver's steering control. The direction indicator 20 turns off automatically after blinking N1 times (three times) defined on the assumption that the lane change is carried out by the driver's steering control.

In the case of a lane change by the driver's steering control, generally, the driver confirms the surroundings and controls the direction indicator 20 to blink in a situation in which the lane change can be performed. On the other hand, in the lane change by the automated or autonomous drive control, it is conceivable that the driver controls the direction indicator 20 to blink and starts the lane change process at a timing desired by the driver him/herself regardless of the surrounding situation. As such, if it takes time to check the surrounding situation or if it takes time to determine that the lane change is possible, the direction indicator 20 may turn off during the lane change. In one or more embodiments of the present invention, however, fortunately, the number of times of blinking is set with consideration for the characteristics of the automated or autonomous drive control, and the control apparatus 100 can therefore be provided which can perform the lane change similar to the lane change by the driver's steering control and can reduce the possibility that the direction indicator 20 turns off blinking during the lane change. In particular, in a vehicle capable of both the travel control by the automated or autonomous drive control and the travel control by the driver's steering control, it is advantageous in mitigating the uncomfortable feeling given to the driver due to the difference in the turn-off timing.

As described above, the control apparatus 100 according to one or more embodiments of the present invention controls the direction indicator 20 equipped with the one-touch function. The direction indicator 20 starts blinking in response to the driver operating the direction indicator switch 31 and automatically turns off after the first blinking time elapses which is defined on the assumption that the driver conducts the lane change. When the subject vehicle changes lanes by the automated or autonomous drive control in an automated or autonomous manner due to the driver operating the direction indicator switch 31, the control apparatus 100 extends the first blinking time to a second blinking time longer than the first blinking time and controls the direction indicator 20 to automatically turn off. Through this operation, the driver does not have to operate to turn off the direction indicator 20, complicated control for turning off the direction indicator 20 is unnecessary, and the direction indicator 20 blinks only for a time suitable for the scene of lane change. As a result, it is possible to reduce the burden on the driver of a vehicle that can change lanes in an automated or autonomous manner.

Moreover, when the subject vehicle changes lanes by the automated or autonomous drive control, the control apparatus 100 according to one or more embodiments of the present invention determines during the first blinking time whether or not the subject vehicle can change lanes, on the basis of the detection result of the camera 41, the radar 42, or the communication device 43. When determining that the subject vehicle can change lanes, the control apparatus 100 extends the first blinking time to the second blinking time. This can prevent the direction indicator 20 from turning off during the lane change and can also prevent the driver from being forced to operate the direction indicator 20 to turn on.

Furthermore, when the subject vehicle changes lanes by the automated or autonomous drive control, the control apparatus 100 according to one or more embodiments of the present invention determines during the first blinking time whether or not the driver has steered in the direction of the lane change, on the basis of the detection result of the steering angle sensor 44 or the attitude sensor 45. When determining that the driver has steered in the direction of the lane change, the control apparatus 100 controls the direction indicator 20 to blink for the first blinking time from the timing at which the driver has steered. This allows the direction indicator 20 to blink for the first blinking time so as to coincide with the timing at which the driver starts to change lanes and, thereafter, the direction indicator 20 automatically turns off. As a result, it is possible to suppress the uncomfortable feeling given to the driver due to the turn-off timing.

Embodiments of the present invention have heretofore been described, but these embodiments are described to facilitate understanding of the present invention and are not described to limit the present invention. It is therefore intended that the elements disclosed in the above embodiments include all design changes and equivalents to fall within the technical scope of the present invention.

For example, in the above-described embodiments, during the travel by the automated or autonomous drive control while blinking the direction indicator 20, the control apparatus 100 may turn off the direction indicator 20 when detecting the driver's steering control and determining that the direction of the driver's steering control conflicts with the direction of the lane change by the automated or autonomous drive control. Through this operation, the intention of not changing lanes is indicated to other vehicles traveling around the subject vehicle without forcing the driver to operate the direction indicator 20 to turn off. Examples of the scene in which the driver steers in the opposite direction to the direction of lane change while the direction indicator 20 is blinking include a scene in which the driver determines that the driver should travel straight ahead rather than change lanes.

In the present description, the control system 1 is described as an example that includes the control apparatus 100 as an embodiment of the control apparatus according to the present invention, but the present invention is not limited to this.

In the present description, the control apparatus 100 which includes the travel controller 11, the direction indicator controller 12, and the storage 13 is described as an embodiment of the processor according to the present invention, but the present invention is not limited to this.

In the present description, the direction indicator 20 provided with the one-touch function is described as an embodiment of the direction indicator according to the present invention, but the present invention is not limited to this.

In the present description, the blinking time corresponding to the number of times N1 is described as an embodiment of the first blinking time according to the present invention, but the present invention is not limited to this.

In the present description, the blinking time corresponding to each of the numbers of times N2 to N5 is described as an embodiment of the second blinking time according to the present invention, but the present invention is not limited to them.

In the present description, the subject vehicle is described as an example that is equipped with the camera 41, the radar 42, or the communication device 43 as an embodiment of the first detector according to the present invention, but the present invention is not limited to this.

In the present description, the subject vehicle is described as an example that is equipped with the steering angle sensor 44 or the attitude sensor 45 as an embodiment of the second detector according to the present invention, but the present invention is not limited to this.

In the present description, the "one-touch operation" is described as an example as an embodiment of the operation of the driver according to the present invention, but the present invention is not limited to this.

DESCRIPTION OF REFERENCE NUMERALS

1 Control system
100 Control apparatus
11 Travel controller
12 Direction indicator controller
13 Storage
20 Direction indicator
21 Left-side flashers
22 Right-side flashers
30 Steering apparatus
31 Direction indicator switch
32 Steering wheel
33 Steering actuator
40 Detection apparatus
41 Camera
42 Radar
43 Communication device
44 Steering angle sensor
45 Attitude sensor

The invention claimed is:
1. A method of controlling a direction indicator using a processor, comprising:
controlling a blinking time of the direction indicator being configured to start blinking in response to an operation of a driver of a subject vehicle and automatically turn off, wherein the blinking time is from a time the direction indicator starts blinking to a time the direction indicator automatically turns off;

determining whether an automated or autonomous lane change function is set,
  wherein a lane change function is based on a first steering control by the driver or a second steering control by the automated or autonomous lane change function, and
  wherein the automated or autonomous lane change function is a function of changing in an automated or autonomous manner from a lane in which the subject vehicle is traveling to another lane in response to the operation of the driver;

when it is determined that the automated or autonomous lane change function is not set, setting the blinking time of the direction indicator to a first blinking time; and when it is determined that the automated or autonomous lane change function is set, setting the blinking time of the direction indicator to a second blinking time longer than the first blinking time.

2. The method of controlling the direction indicator according to claim 1, comprising:
  when the subject vehicle changes lanes in the automated or autonomous manner, determining during the first blinking time whether or not the subject vehicle can change lanes, on a basis of a detection result of a first detector equipped in the subject vehicle to detect a situation around the subject vehicle; and
  when determining that the subject vehicle can change lanes, extending the first blinking time to the second blinking time.

3. The method of controlling the direction indicator according to claim 1, comprising:
  when the subject vehicle changes lanes in the automated or autonomous manner, determining during the first blinking time whether or not the driver has steered in a direction of a lane change, on a basis of a detection result of a second detector equipped in the subject vehicle to detect a direction of steering control performed by the driver; and
  when determining that the driver has steered in the direction of the lane change, controlling the direction indicator to blink for the first blinking time from a time at which the driver has steered.

4. The method of controlling the direction indicator according to claim 2, comprising:
  when the subject vehicle changes lanes in the automated or autonomous manner, determining during the first blinking time whether or not the driver has steered in a direction of a lane change, on a basis of a detection result of a second detector equipped in the subject vehicle to detect a direction of steering control performed by the driver; and
  when determining that the driver has steered in the direction of the lane change, controlling the direction indicator to blink for the first blinking time from a time at which the driver has steered.

5. An apparatus for controlling a direction indicator, the apparatus comprising a processor operating to:
  control a blinking time of the direction indicator being configured to start blinking in response to an operation of a driver of a subject vehicle and automatically turn off, wherein the blinking time is from a time the direction indicator starts blinking to a time the direction indicator automatically turns off;
  determine whether an automated or autonomous lane change function is set,
    wherein a lane change function is based on a first steering control by the driver or a second steering control by the automated or autonomous lane change function, and
    wherein the automated or autonomous lane change function is a function of changing in an automated or autonomous manner from a lane in which the subject vehicle is traveling to another lane in response to the operation of the driver;
  when it is determined that the automated or autonomous lane change function is not set, set the blinking time of the direction indicator to a first blinking time; and
  when it is determined that the automated or autonomous lane change function is set, set the blinking time of the direction indicator to a second blinking time longer than the first blinking.

* * * * *